United States Patent

Kampfer

[15] 3,637,095
[45] Jan. 25, 1972

[54] CART-LOADING MACHINE
[72] Inventor: David H. Kampfer, St. Paul, Minn.
[73] Assignee: Conveyor Specialties Company, St. Paul, Minn.
[22] Filed: July 8, 1969
[21] Appl. No.: 50,015

[52] U.S. Cl. .............................................. 214/16.6, 214/41
[51] Int. Cl. ......................................................... B65g 67/00
[58] Field of Search .............................. 214/16.4 R, 16.6, 41

[56] References Cited

UNITED STATES PATENTS

| | | | |
|---|---|---|---|
| 2,936,908 | 5/1960 | Carothers | 214/16.6 |
| 1,518,278 | 12/1924 | Schroeder | 214/41 |

Primary Examiner—Gerald M. Forlenza
Assistant Examiner—Lawrence J. Oresky
Attorney—Frank B. Hill

[57] ABSTRACT

This invention relates to a cart-loading machine having outside, intermediate and inner frames where multiloading shelves are utilized to receive the containers at a single loading elevation. The loading shelves are positioned in a lowered position and raised as they are filled to elevated positions by telescoping pins. The filled multiloading shelves are then automatically moved into a roll away cart by movement of the intermediate and inner frames. When the containers are positioned over the cart storage shelves, the intermediate frame is then withdrawn, which includes the loading shelves. The inner frame, which includes push rods, is held stationary with respect to the outer frame and the cart butt is moved forward with respect to the intermediate frame causing the containers to be removed from the loading shelves and dropped on the storage shelves of the cart. When all the containers are removed, the inner shelf will move back to its original position to facilitate receiving other containers on the multiloading shelves. An automatic cart-turning unit is provided which can be utilized to rotate the cart when half of the cart is filled, exposing the unfilled half. The loading shelves will be returned to their lowered position. In some application an uncasing heat will be utilized to load and accumulate the containers from filled cases.

10 Claims, 9 Drawing Figures

INVENTOR.
DAVID H. KAMPFER
BY
Frank B. Hill
ATTORNEY

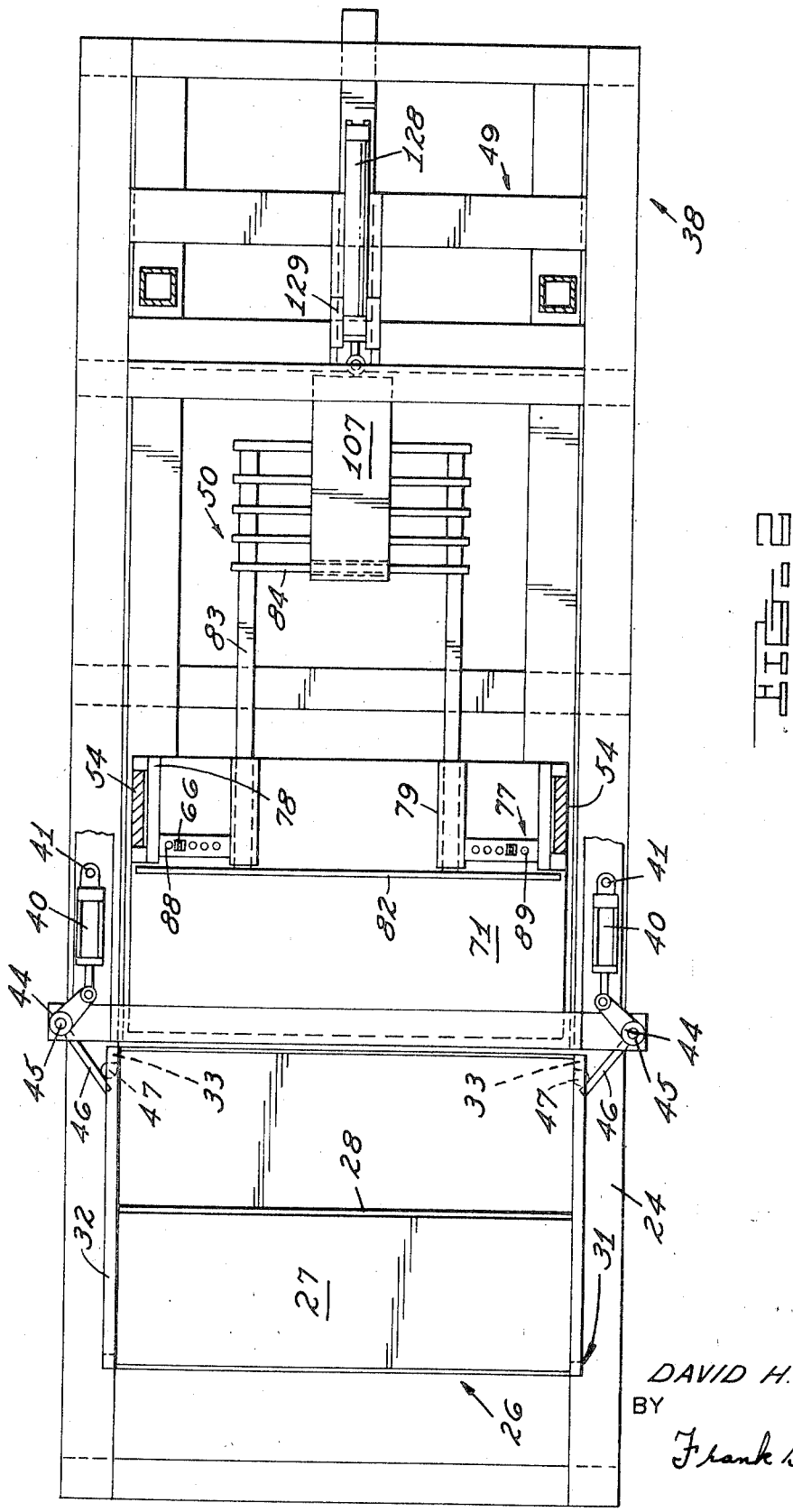

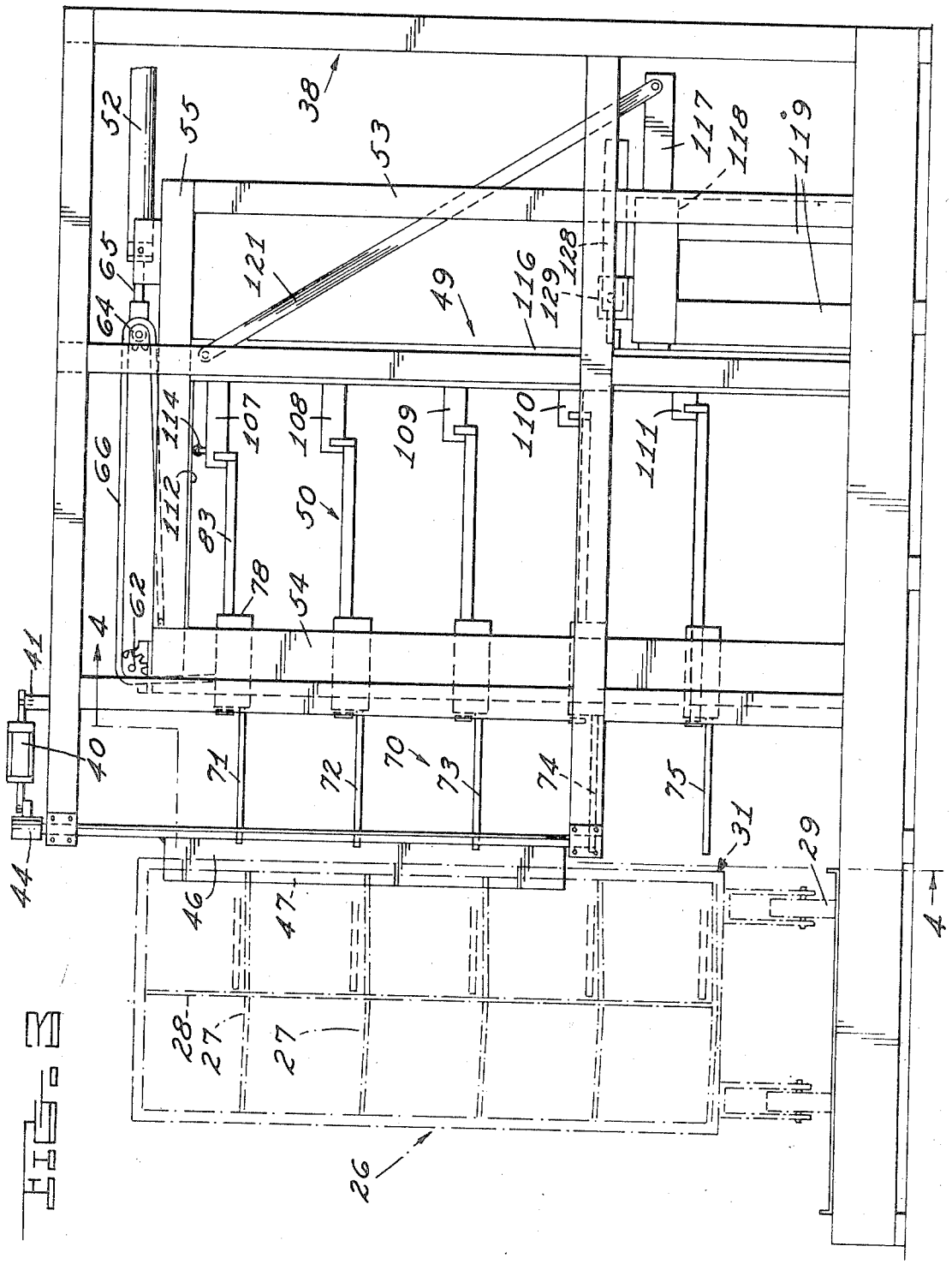

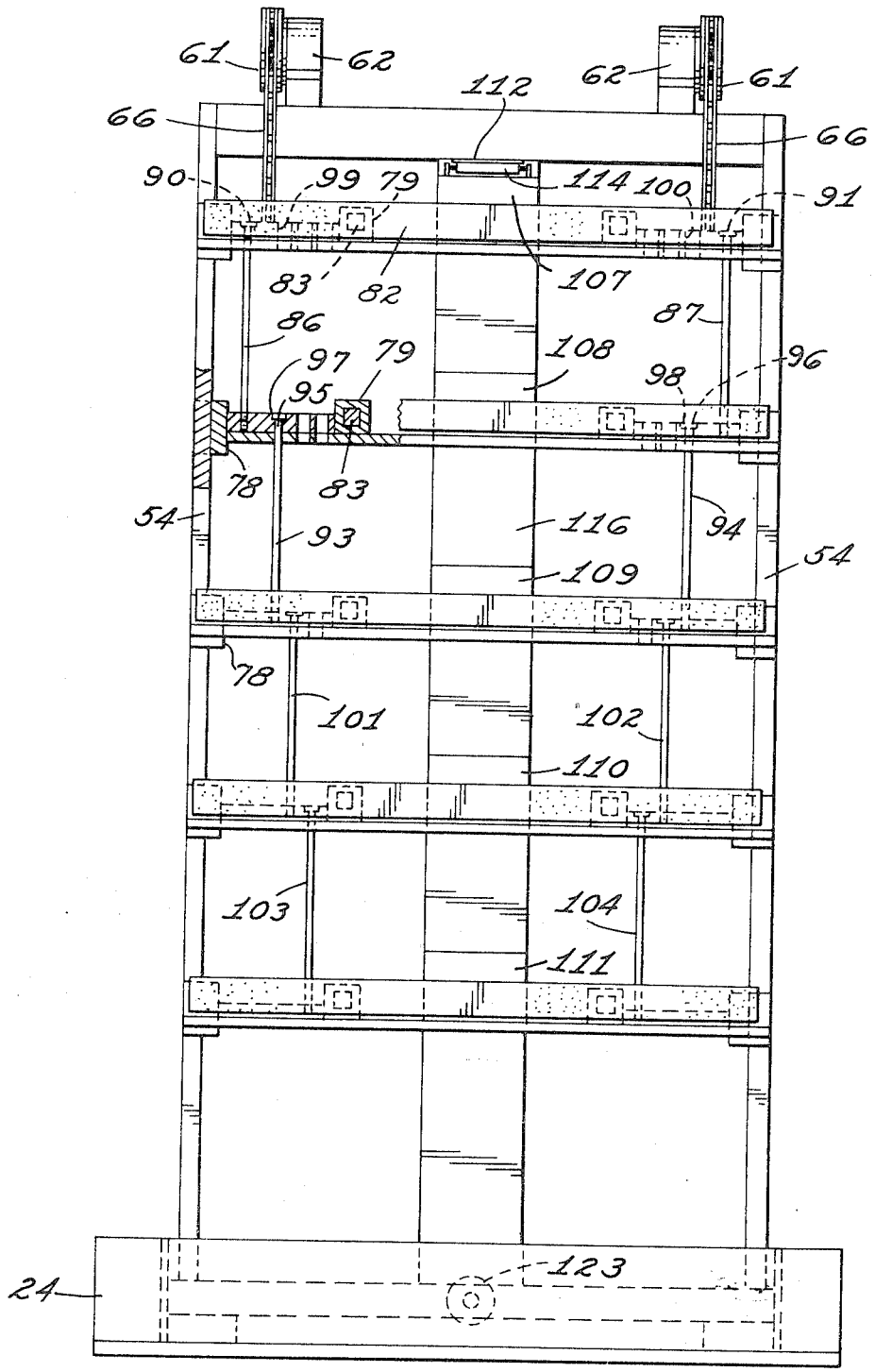

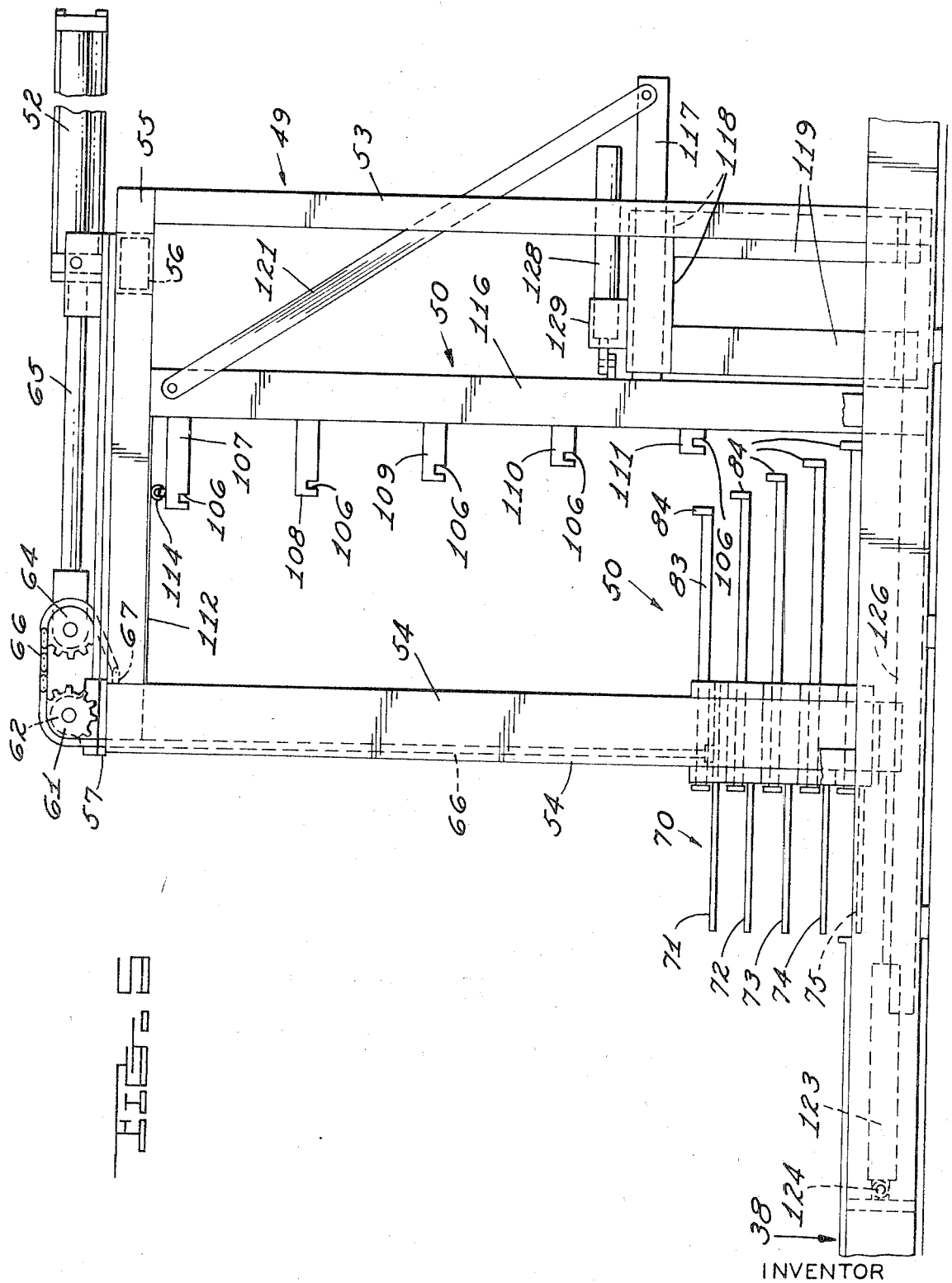

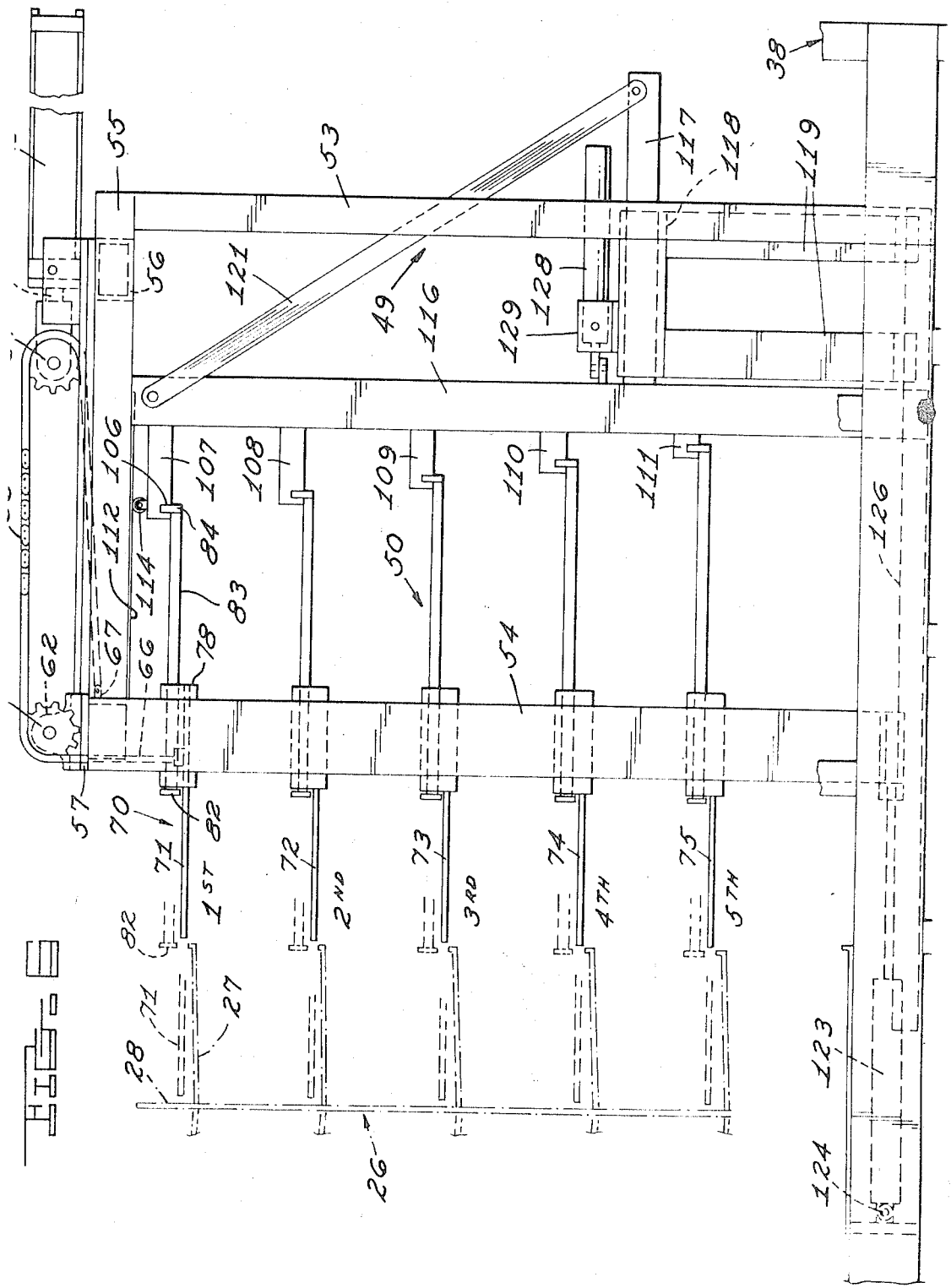

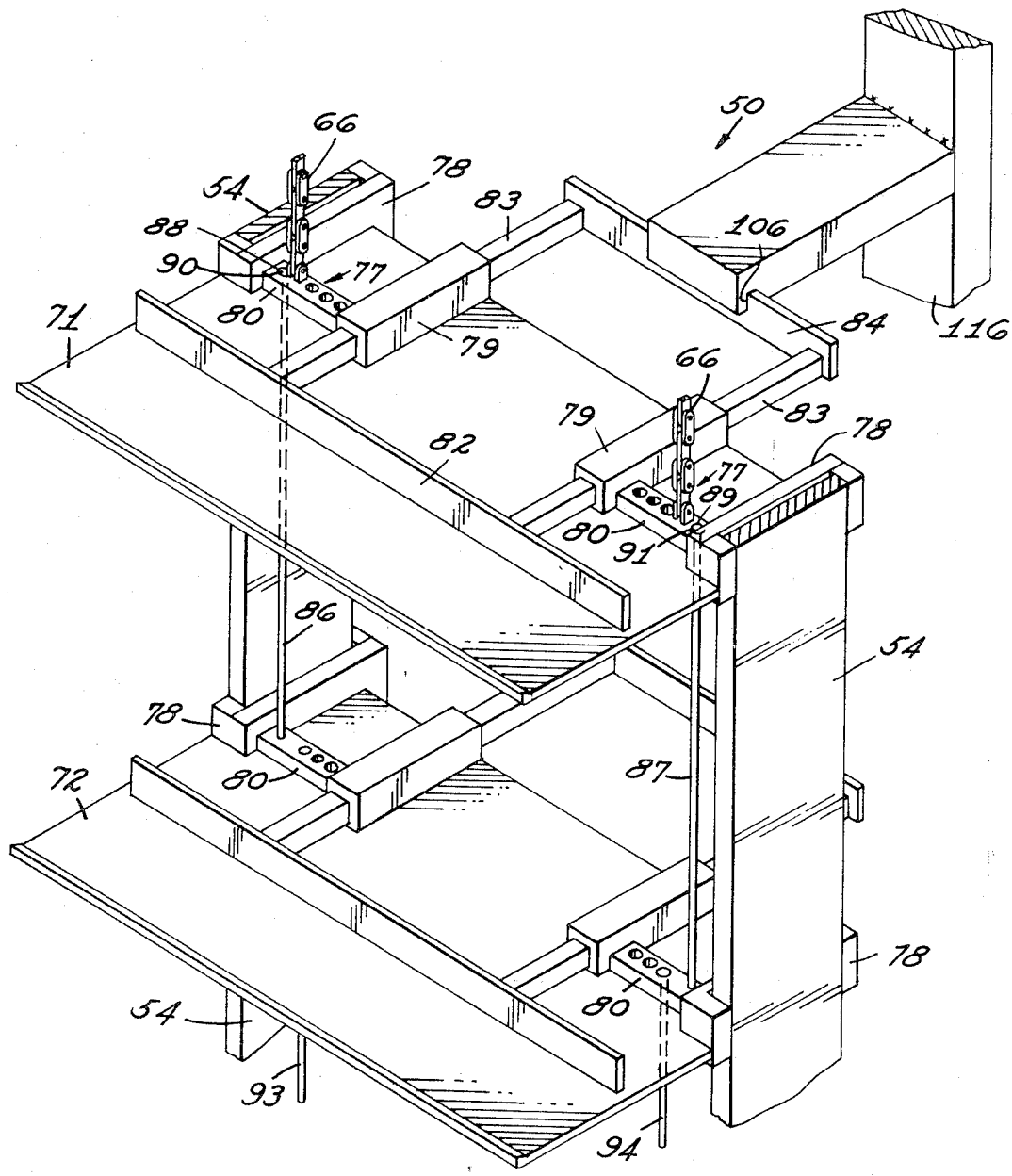

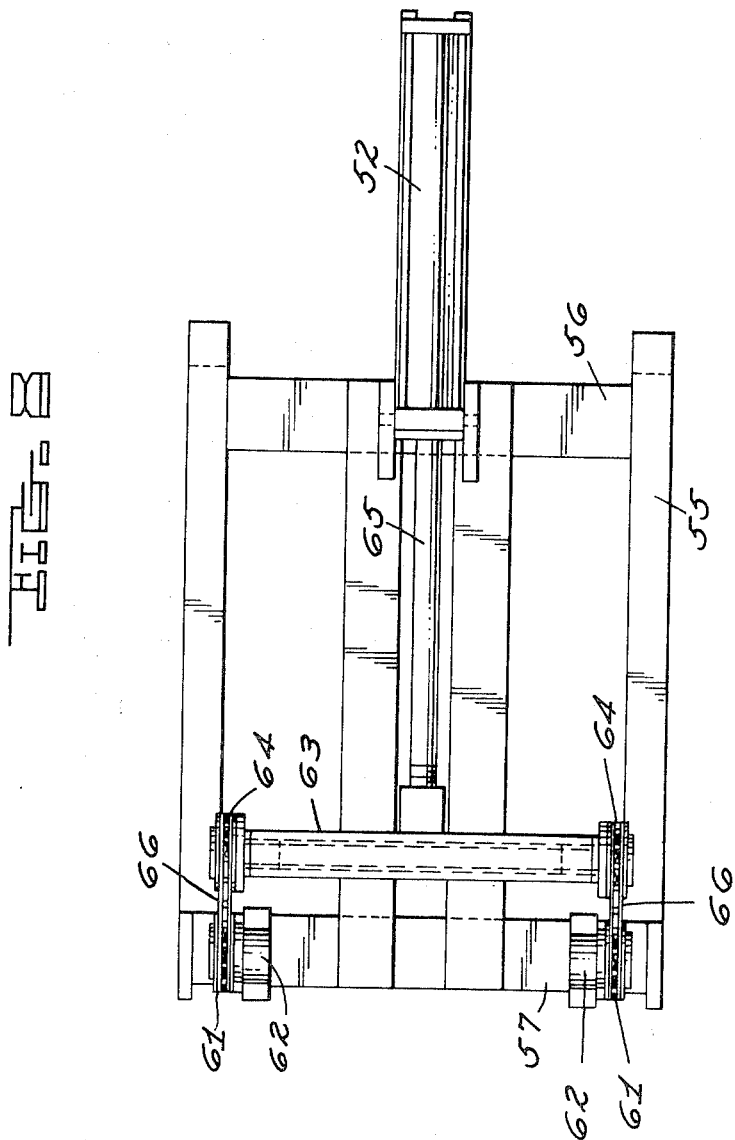

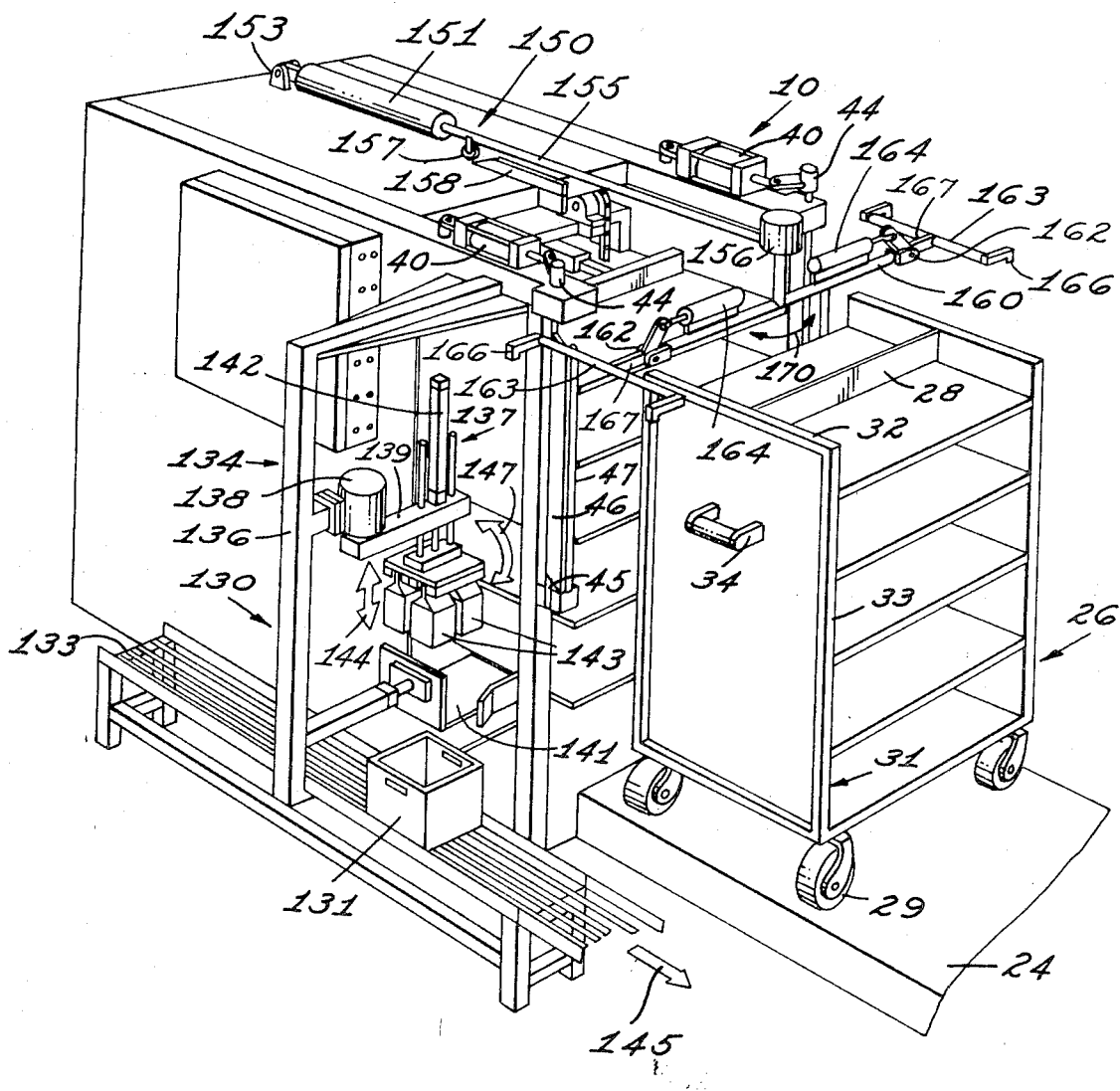

CART-LOADING MACHINE

The present invention relates to a novel cart-loading system and in particular to a multishelf double-sided loading system.

In the food distribution industry various new marketing procedures and systems have been developed and utilized in an attempt to improve the distribution of food products, eliminate labor costs, and ease the accessibility for the consumer. One of the changes in the marketing steps, which is presently in use, is to distribute products such as milk on roll away carts which can be loaded at the dairy or production plant and transported to the distribution center where it is wheeled to the customer pickup point.

At the distribution center the cart can be moved into storage ready for use at the consumer pickup point. In the milk industry this cart would be moved to a refrigerated storage space and then moved to a housing which is refrigerated and can receive the loaded cart permitting milk to be removed from either side by the customer.

In addition, for marketing in this type of distribution program, it was critical to provide a cart-loading system which could automatically load the cart to maintain the low labor cost necessary for this program. One of the objects of the present invention is to provide a cart casing system providing for casing of multiple layer carts.

Another object of the present invention is to provide an automatic cart-loading system for a multilayer cart which receives containers from a conveyor system from a single-line conveyor source.

Still another object of the present invention is to provide a multilayer cart having two sides which can be automatically loaded on one side and then automatically rotated, having the second side automatically loaded and ready for removal and loading of the next cart.

A still further object of the present invention is to provide a multilayer carton-loading system which can be loaded from a conveyor line bringing cased cartons by providing an uncasing operation, including a means for the removal of the cased cartons, and placing them on a platform to be loaded into the cart-loading machine.

Also, an object of the present invention includes the provision of a cart-loading structure capable of accomplishing the above objectives at a minimum of cost and manufacturing and maintenance expense; and at the same time, being composed of simple and ruggedly formed members which will be reliable in application.

IN THE DRAWINGS

FIG. 2 is a top plan view of a cart loading machine similar to FIG. 1, partly in cross section, with the top cover removed, showing the multilayer double-sided cart in locked position ready for loading.

FIG. 3 is a partial side-elevational view of the cart-loading machine illustrated in FIGS. 1 and 2, with the side cover removed, showing the outside, intermediate and inside frame of the present invention.

FIG. 4 is a front elevational view, partly in cross section, illustrating the principles of the present invention and taken generally along line 4—4 of FIG. 3.

FIG. 5 is a side-elevational view, with the side cover removed, showing the intermediate and inside frames of the present invention, illustrating the multiple loader shelves in their lowered position.

FIG. 6 is a side-elevational view, with the side cover removed, showing the intermediate and inside frames of the present invention, similar to FIG. 5, illustrating the multiple loader shelves in their raised position and illustrating a portion of the cart in phantom.

FIG. 7 is a prospective view, illustrating the first and second loading shelves of the cart-loading machine and illustrating part of the relative movement of the intermediate and inside frames.

FIG. 8 is a top plan view of the cart-loading machine-shelf system, with the top cover removed, showing the loading shelf actuator and the gear and chain raising and lowering arrangement similar to the arrangement illustrated in FIG. 5.

FIG. 9 is a prospective view, illustrating a cart-loading machine having a case conveyor line bringing cased containers to the loading station of the cart-loading machine and illustrating the principles of the present invention including cart-turning unit.

Figure 1:
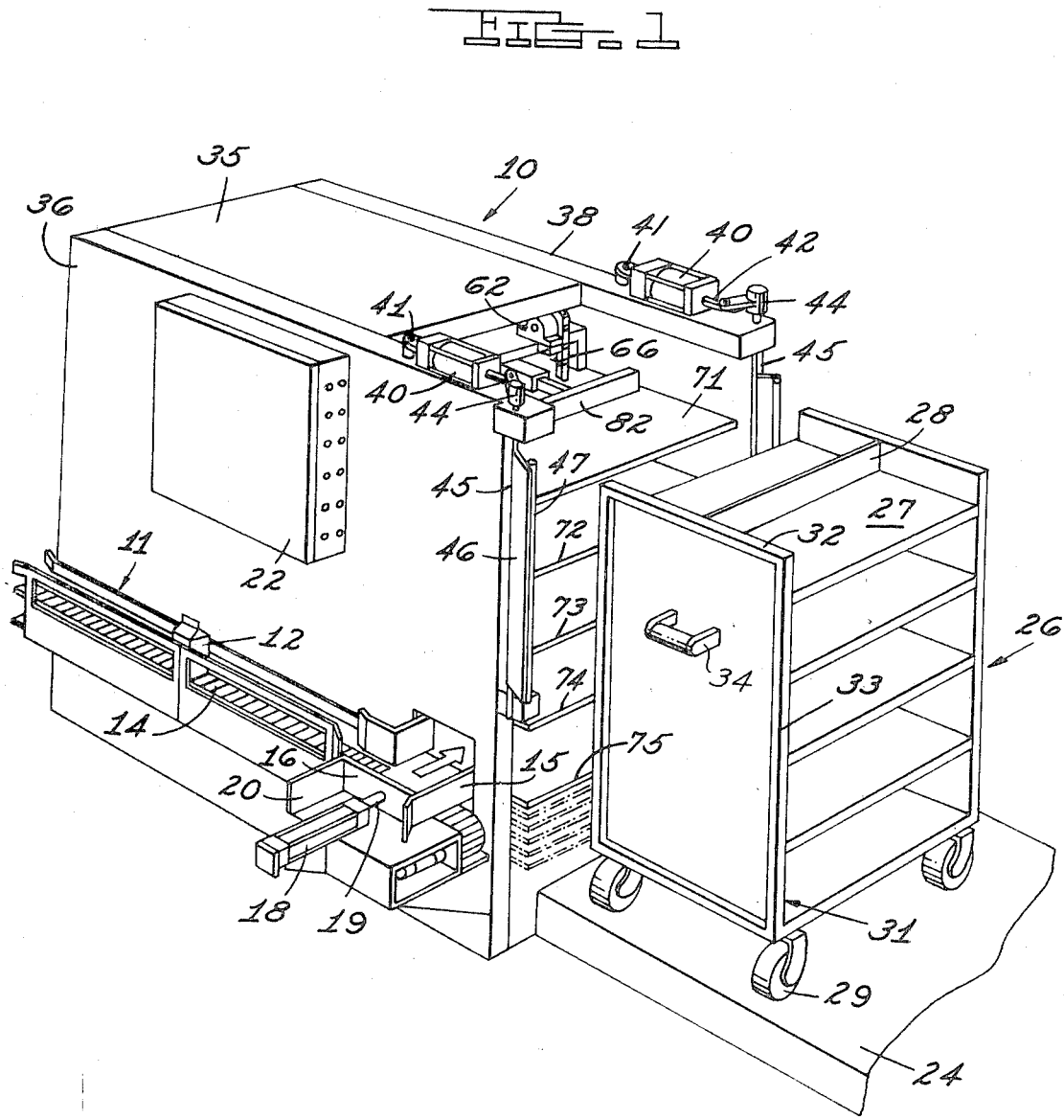
FIG. 1 is a prospective view of a cart-loading machine with a single-line conveyor bringing cartons to the cart-loading machine and having a multilayer double-sided cart located just prior to moving in position for loading and illustrating the principles of the present invention.

Generally describing the function of the cart-loading machine, a conveyor system will bring containers into an accumulating position to be loaded on a series of loading shelves within the cart-loading machine. When the first loading shelf is filled, it will be elevated to a second position and a second loading shelf will be moved into receiving position to be loaded with accumulated containers and this operation will continue until all the loading shelves of the cart-loading machine have been filled with containers.

A stationary outside frame will house the cart-loading machine; and when the loading shelves are filled, an actuating mechanism will move an intermediate frame and an inside frame forward, positioning the loaded containers into position to be placed on a multishelf cart. After the loading shelves are positioned over the storage shelves of the cart, the intermediate frame actuating means will start returning the loading shelves to the cart-loading machine. At the same time an inside frame actuator will act on push rods which act with the loading shelves preventing the containers from being returned to the cart-loading machine with the loading shelves.

After the loading shelves have passed from under the containers, they will drop into receiving position of the storage shelves of the cart. When the loading shelves have passed the last container, the inside frame actuator will then return the push rods to their original position with respect to the loading shelves. After the loading shelves have returned within the cart-loading machine, they will then be lowered to their original position so the first loading shelf can start receiving accumulated containers. At this time, the cart will either be manually turned from its initial loading position or automatically turned so that the opposite sides of the multishelves of the cart can be filled in a cart having separater ribs. Then the above-mentioned procedure will be repeated, filling the opposite side of the multishelved cart.

Referring mainly to FIG. 1, there is a cart-loading machine generally referred to by the numeral 10. The cart-loading machine 10 is serviced by a conveyor system 11, which will bring containers, such as illustrated by container 12, into position to be passed into the cart loading machine 10. The containers 12 will move along a conveyor chain 14 and come in contact with a stop plate 15. After a predetermined number of containers are placed in front of a pusher plate 16, it will move them into the cart-loading mechanism 10. A pusher cylinder 18 has a pusher rod 19 which is connected to the pusher plate 16. When the pusher plate 16 crosses the path of the conveyor chain 14, a retainer plate 20 will block further containers 12 from passing on down the conveyor chain 14 until the push cylinder 18 has returned the pusher plate 16 to its receiving position, as illustrated in FIG. 1.

The various actuating units, such as pusher cylinder 18, are controlled by a control box 22. The control box 22 will have controls which will initiate action after a predetermined number of containers 12 have passed into the cart 10, causing the loading shelves which receive the containers 12 to be elevated to a raised position so that a lower adjacent loading shelf can be raised into loading position to start receiving containers from the pusher plate 16.

A cart platform 24 is provided at the front of the cart-loading machine 10 and supports a cart 26. The cart 26 is a multishelf cart having shelves referred to by numeral 27, which are divided by a separater rib 28, and the cart 26 is mobilized by use of rollers 29. The ends of the cart have control frames 31 which include top frames 32 and side frames 33. Pull handles 34 are also provided for the operator to move the cart 26. The cart loading mechanism 10, as viewed in FIG. 1, has a top cover 35 and side covers 36 which are mounted on an outside frame 38.

Positioning cylinders 40 are mounted on the outside frame 38 and are pivotally mounted by anchor pins 41. Positioning rods 42 extend from the opposite end of the positioning cylinders 40 and connect to actuator caps 44. As viewed in FIG. 1, the positioning cylinders 40 are in their extended position. When they are retracted, they act on the actuator caps which rotate actuator rods 45. The actuator rods 45 have positioning flanges 46 secured to them, which in turn have positioning rods 47 secured to their outer edges.

When the cart 26 is to be loaded by the cart-loading machine 10, it will initially be positioned near the front of the cart-loading machine 10 and an initiation button will be pressed in the control box 22 causing the positioning cylinders 40 to be retracted, which will cause the actuator rods 45 to rotate toward each other and have the positioning rods 46 act on the side frames 33, locating and locking the cart 26 in position for loading.

Referring generally to FIG. 2, there is illustrated a top plan view of the cart-loading machine with the top cover 35 removed. The cart-loading machine 10 has the outside frame 38, which is stationary, and an intermediate frame 49 and an inside frame 50 which are both moveable as will be explained in more detail below.

Referring generally to FIG. 5, we have a loading shelf actuator 52 which is mounted on the intermediate frame 49. The intermediate frame 49 has rear posts 53 and front posts 54, which support top beams 55. A rear cross beam 56 connects the top beams 55 near the rear post 53. Top beams 55 are connected above front posts 54 by front crossbeams 57.

A pair of secured gears 61 are mounted on the front crossbeam 57 and are rotatably mounted in bearing housings 62, best viewed in FIGS. 5 and 8. A pair of moveable gears 64 are mounted on a bearing cylinder 63 which connected the loading shelf actuator 52 by an actuator shaft 65 which is controlled by the loading shelf actuator 52. A shelf chain 66 is secured to the loading shelves, as will be explained in more detail below, at one end and to the intermediate frame 49 by securing lug 67, as best viewed in the phantom in FIG. 5. As illustrated in FIG. 5, the loading shelf actuator 52 is in the forward position, having the shelves positioned in their lowered location ready for loading to start on the first or top loading shelf. As the various shelves are loaded, the loading shelf actuator 52 is retracted and the shelf chain 66 will be raised and the securing gear 61, and the moveable gear 64, are rotated permitting the chain to smoothly rise along the front post 54. FIG. 6 illustrates the loading shelf actuator 52 and the shelf chain 66 and their associated parts in their retracted positions, or up positions.

Referring generally to FIGS. 4, 5, 6 and 7, we have a series of loading shelves referred to by numeral 70. The top loading shelf is referred to as first loading shelf 71 and the subsequent shelves are referred to as second, third, fourth, and fifth loading shelves 72, 73, 74 and 75, respectively. The loading shelves have guide assemblies 77, which include side guides 78, which act in conjunction with front posts 54 and guide the loading shelves 71 through 75 as they are raised from their lowered positions to their raised positions. The guide assemblies have rod guides 79 which are connected to the side guides by block members 80. Pusher members 82 extend substantially across the loading shelves 71 through 75, and are part of the inner frame 80. Two pusher rods 83 connect to the pusher member 82 at their front end are connected at their rear end by guide members 84.

As viewed in FIG. 5, the loading shelves 71 through 75 are in lowered position and the loading shelf 71, which is the top shelf, is positioned to receive the containers from the conveyor chain 14 when the appropriate number of containers are accumulated ahead of the pusher plate 16. When the loading shelf 71 is filled, the loading shelf actuator 52 is actuated to be retraced to be moved rearward until the loading shelf 71 is raised to what would be a position indicated as loading shelf 74 as viewed in FIG. 6. Then the second loading shelf 72 would be positioned at the location loading shelf 71 is illustrated in FIG. 5 and is positioned to be filled. When the loading shelf 72 is filled by the pusher plate 16, loading shelf actuator 52 would again be activated to move moveable gear 64 rearward so that the loading shelves 71, 72 and 73 would be moved one step higher.

Loading shelf 71 is raised by the action of shelf chain 66. When the loading shelf 71 is raised the first time, lifting pins 86 and 87, which are mounted in loading shelf 72, extend through openings 88 and 89 of the block members 80 mounted on loading shelves 71 which catches their head member 90 and 91 respectively, lifting the shelf 72 to the receiving or filling position as explained above. After shelf 72 is positioned and filled, it is moved to the next raised position and loading shelf 73 is then positioned to receive the accumulated containers from the conveyor chain 14 by the pusher plate 16. When the third shelf 73 is moved into receiving or loading position, it is raised by the action of lifting pins 93 and 94, which are secured to the loading shelf 73. Their heads 95 and 96 act in openings 97 and 98 of the block members 80 of loading shelf 72. When the loading shelf 73 is in its lowered position, the head members 95 and 96 pass through openings 99 and 100 which are provided in the block member 80 of the loading shelf 71.

The loading shelves 74 and 75 have lifting pins 101–102 and 103–104 respectively, which act with their adjacent loading shelves 73 and 74, respectively, in a similar manner to the pins just explained for loading shelves 72 and 73. A full discussion of which is not needed but would be the same as the discussion above for pins 86–87 and 93–94. When all the loading shelves 71–75 have been loaded and are positioned in their uppermost position, as illustrated in FIG. 6, the guide members 84 will be positioned in a receiving slot 106 of mover flanges 107, 108, 109, 110 and 111, which will act on the loading shelves 71, 72, 73, 74 and 75, respectively.

A follower surface 112 is provided adjacent the top of the inside frame 50 as part of the intermediate frame 49, and is acted upon by a follower 114 which is mounted on the mover flange 107. The mover flanges 107 through 111 are connected to, and inherent with, a rib post 116. The rib post 116 has a guide member 117 connected to it. The guide member 117 is positioned in a stabilizing member 118, which is part of the intermediate frame 49. The stabilizing member 118 is connected by support members 119 to the intermediate frame 49 and moves with it. A tie bar 121 is connected to the end of the guide member 117 and to the top portion of the rib posts 116 to give stability of the movement of the inside frame 50.

An intermediate frame actuator 123 is mounted to the outside frame 38 by a securing mounting means 124. Viewed in FIG. 6, the intermediate frame actuator 23 is in its extended position and is connected to the intermediate frame near the front post 54. The intermediate frame 49 has two guide bases 126 which are on both sides of the intermediate frame and extend in the direction of its movement. When the intermediate frame actuator 123 is retracted, the series of loading shelves 70 will be loaded and in their up position. The filled loading shelves 71–75 will pass into the cart 26 and position the loaded containers over the storage shelves 27. At this time the intermediate frame actuator 123 will then be extended again, which will cause an inside frame actuator 128, which is mounted on the stabilizing member 118 by a mounting member 129, to be activated. The rate of movement of the inside frame actuator 128 will be substantially equal to the movement of the intermediate frame actuator 123 thus causing the pusher members 82 to remain at the edge of the storage shelves 27 of the cart 26. Because of the intermediate frame actuator's 123 movement, the loading shelves 71, 72, 73, 74 and 75 will be moving rearward or away from the storage shelves 27, while the pusher members 82 will be holding stationary in respect to the storage shelves 27 of the cart 26, forcing the loaded cartons to be removed from the loading shelves 71–75 causing them to drop down and be positioned on the storage shelves 27. When the loading shelves 71–75 have passed the edge of the storage shelves 27, the inside frame actuator 128 will then be retracted and move the inside frame 50 to its loaded up position; at which time the loading shelf actuator 52 will be extended and the series of loading shelves 70 will be positioned in the down position as illustrated in FIG. 5 and ready for the next load of containers.

Referring to FIG. 9, the cart loading machine 10 is illustrated and is basically the same as the cart-loading machine shown in FIG. 1. The total system has some additions which includes an alternate embodiment for the transferring of containers from the conveyor system to the loading shelves which will be explained in more detail below. It is also provided with an automatic cart turning unit which will also be explained in more detail below.

A conveyor system 130 is provided and brings cases 131 along a conveyor chain 133. The case 131 is stopped below a case unloader system 134. The case unloader 134 is provided with a support frame 136. A pickup head assembly 137 is mounted to the support frame 136. The pickup head assembly 137 has a rotary motor 138 which acts on a support bar 139. The support bar 139 is illustrated in its unloaded position just above a receiving plate 141. A head actuator 142 illustrated in its up position in FIG. 9 will lower the containers 143 on to the receiving plate 141 and then will be raised back to the position shown in FIG. 9, leaving the container on the receiving plate 141. This movement is illustrated by arrow 144. The empty case 131 will be released to continue on along the conveyor chain 133 in a direction indicated by arrow 145. Another case 131 will be positioned in the unloading position as illustrated in FIG. 9 and the rotary motor 138 will rotate the support bar 139 to a receiving position over the conveyor chain 133, and the head actuator 142 will be lowered to pick up the accumulated containers in case 131. At this time the rotary motor 138 rotates the pickup head assembly 137 as indicated by the arrow 147. The receiving plate 141 will receive and pass the accumulated containers 143 on to the loading shelf and after a predetermined number of containers are loaded, the loading shelf will be filled and will be lifted to a second position so that another loading shelf will be in position to be loaded, having the same action as explained above in FIGS. 1 through 8.

After one side of the cart 26 is filled, when it is in loading position as described above, a cart-turning unit 150 will be activated to turn the cart 26 180° so its other half can be filled. The cart-turning unit 150 has a cart-turning actuator 151 which is connected to the outside frame 38 by a securing means 153. The cart-turning actuator 151 has a shaft 155 having one end positioned inside the cart-turning actuator 151 and the other end supporting a rotary motor 156 positioned on it. A cam follower 157 is positioned intermediate the two ends of the shaft 155 and acts with a cam member 158, the full function of which will be explained in more detail below. The rotary motor 158 is connected to a rotary arm 160. The rotary arm 160 extends above the cart 26 and is substantially equal to the length of the cart 26. Bearing housings 162 are positioned at the ends of the rotary arm 160 and receive lifting crossarms 163. Clamping valves 164 are mounted adjacent the bearing housings 162 and are secured to the rotary arms 160. Lifter crossarms 163 have L-shaped clamping tips 166 secured to their ends. Securing flanges 167 are positioned substantially at the middle of the lifting crossarms 163 and are connected to the clamping valves 164. When one side of the cart 26 is filled, the clamping valves 164 are activated and extend forward, acting on the securing flanges to rotate the lifting crossarms 163 in a down direction, or clamping direction, causing the clamping tips 166 to act below the top frame 32 and to securely grip the cart 26. The cart-turning actuator 155 is activated and extends shaft 155 to move the cart 26 away from the cart-loading machine 10. When the shaft 155 is being extended, the cam follower 157 acts on the cam member 158 which crosses the front end of the cart-turning unit 150 to raise, lifting the cart 26 off the cart platform 24. When the shaft 155 has been extended, the rotary motor 156 is activated and rotates the cart 26 180° so its opposite side is now facing the cart-loading machine 10. At which time the shaft 155 is then retracted and the cart is brought back into loading position. At which time the positioning cylinders 40 are activated, bringing positioning rods 47 in contact with the side frames 33 and holding the cart 26 in locked position for loading. The clamping valves 164 are again activated, rotating the lifting crossarms 163 to their up position, or unclamped position, so that the clamping tips 166 are out of contact with the top of the cart 26. After the opposite side is filled, then the operator can remove the cart 26 from the cart platform 24 and position the next cart 26 for loading. The rotary motor 156 rotates the same 180° alternately. When the next cart 26 is in filling or loading position, it will rotate in the opposite 180°-direction in reference to the prior cart 26. Thus rotating back and forth between the 180°-positions. An example would be for the first cart 26 to be rotated in a clockwise direction and the next cart 26 to be rotated in a counterclockwise direction. This movement is illustrated by arrow 170.

It will be seen from the above that simple and inexpensive yet practical and durable means have been disclosed for attaining the desired end. Attention is then invited, however, to the principles of making variations within the spirit and scope of the invention disclosed in the above specification. Also, directional terms such as, "in," "out," "up," "down," "clockwise," and "counterclockwise" to facilitate explaining the direction in the disclosure and are not to be considered as limiting the disclosure.

IN THE CLAIMS

Other modes of applying the principles of my invention may be employed, instead of those explained, change being made as regards the article and combinations herein disclosed, provided the means or features stated by any of the following claims or the equivalent of such stated means or features be employed.

I therefore particularly point out and distinctly claim as my invention:

1. A cart-loading machine used to load a multishelved cart comprising, in combination:
   a. a container-accumulating means;
   b. at least two loading shelves;
   c. a transfer means moving said accumulated container from the accumulating means to the first of said loading shelves at a loading position;
   d. an elevating means to raise said first loading shelf to a second position and the second loading shelf from a lowered position to the loading position;
   e. a first actuator means to move said loading shelves in said multishelved cart when said loading shelves are filled;
   f. push rods associated with said loading shelves and having said loaded containers positioned between them and said multishelved cart;
   g. a second actuator means connected with said loading shelves to move said push rods;
   h. said second actuator means is activated to cause said push rods to pass over said loading shelves when said first actuator means returns said loading shelves from said multishelved cart which causes said containers to be deposited on the multishelved cart; and
   i. said elevating means to lower said loading shelves to their lowered position.
2. A cart-loading machine as defined in claim 1 having:
   a. a locking means to lock said cart in loading position with respect to said cart-loading machine.
3. A cart-loading machine as defined in claim 1 having:
   a. a cart-turning unit;
   b. said cart-turning unit having a cart-turning actuator;

c. a means to raise said cart-turning actuator;
d. a rotor motor position above said multishelved cart;
e. a rotor arm connected to said rotor motor and rotated by it;
f. clamping means connected to the ends of said rotor arm to act on said multishelved cart; and
g. said clamping means having a clamping position on said multishelved cart and an unclamped position above said cart permitting the cart to be freely moved under said cart-turning unit.

4. A cart-loading machine as defined in claim 1 having:
a. said transfer means including a pusher plate actuated by a pusher cylinder to move a predetermined number of containers in a single line collected by the said accumulating means.

5. A cart-loading machine as defined in claim 1 having:
a. said accumulating means including pickup head assembly to uncase containers accumulated in cases and transfer them to a transfer means having a receiving plate.

6. A cart-loading machine as defined in claim 2, having:
a. a cart-turning unit;
b. said cart-turning unit having a cart-turning actuator;
c. a means to raise said cart-turning actuator;
d. a rotor motor position above said multishelved cart;
e. a rotor arm connected to said rotor motor and rotated by it;
f. clamping means connected to the ends of said rotor arm to act on said multishelved cart; and
g. said clamping means having a clamping position on said multishelved cart and an unclamped position above said cart permitting the cart to be freely moved under said cart-turning unit.

7. A cart-loading machine as defined in claim 2, having:
a. said transfer means including a pusher plate actuated by a pusher cylinder to move a predetermined number of containers in a single line collected by the said accumulating means.

8. A cart-loading machine as defined in claim 2, having:
a. said accumulating means including pickup head assembly to uncase containers accumulated in cases and transfer them to a transfer means having a receiving plate.

9. A cart-loading machine as defined in claim 3, having:
a. said transfer means including a pusher plate actuated by a pusher cylinder to move a predetermined number of containers in a single line collected by the said accumulating means.

10. A cart-loading machine as defined in claim 3, having:
a. said accumulating means including pickup head assembly to uncase containers accumulated in cases and transfer them to a transfer means having a receiving plate.

* * * * *